United States Patent [19]

Hajmrle et al.

[11] Patent Number: 5,976,695
[45] Date of Patent: Nov. 2, 1999

[54] THERMALLY SPRAYABLE POWDER MATERIALS HAVING AN ALLOYED METAL PHASE AND A SOLID LUBRICANT CERAMIC PHASE AND ABRADABLE SEAL ASSEMBLIES MANUFACTURED THEREFROM

[75] Inventors: Karel Hajmrle, Fort Saskatchewan, Canada; Hougong Wang, Cupertino, Calif.

[73] Assignee: Westaim Technologies, Inc., Fort Saskatchewan, Canada

[21] Appl. No.: 08/720,683

[22] Filed: Oct. 2, 1996

[51] Int. Cl.$^6$ .............................. C22C 9/00; C22C 5/06; F01D 11/08; F04D 29/08

[52] U.S. Cl. .................... 428/402; 428/432; 428/446; 428/450; 428/454; 428/457; 415/173.4; 415/174.4; 75/252; 75/254; 75/230; 75/231; 277/941; 277/942; 277/943

[58] Field of Search ........................... 428/402, 426, 428/432, 446, 450, 454, 457; 415/173.4, 174.4; 75/252, 254, 230, 231, 246; 277/236, DIG. 6, 941, 942, 943

[56] References Cited

U.S. PATENT DOCUMENTS

| | | |
|---|---|---|
| 3,053,694 | 9/1962 | Daunt et al. . |
| 3,068,016 | 12/1962 | Dega . |
| 3,084,064 | 4/1963 | Cowden et al. . |
| 3,817,719 | 6/1974 | Schilke et al. . |
| 3,836,156 | 9/1974 | Dunthorne . |
| 3,879,831 | 4/1975 | Rigney et al. . |
| 3,914,507 | 10/1975 | Fustukian . |
| 3,975,165 | 8/1976 | Elbert et al. . |
| 3,985,513 | 10/1976 | Silaev et al. . |
| 4,023,252 | 5/1977 | Levinstein et al. . |
| 4,139,376 | 2/1979 | Erickson et al. . |
| 4,291,089 | 9/1981 | Adamovic . |
| 4,374,173 | 2/1983 | Adamovic . |
| 4,566,700 | 1/1986 | Shiembob ........................ 415/173.4 |
| 4,639,388 | 1/1987 | Ainsworth et al. . |
| 5,049,450 | 9/1991 | Dorfman et al. . |
| 5,122,182 | 6/1992 | Dorfman et al. . |
| 5,196,471 | 3/1993 | Rangaswamy et al. . |
| 5,302,450 | 4/1994 | Rao et al. ........................... 428/357 |
| 5,320,689 | 6/1994 | Mahulikar et al. . |
| 5,324,592 | 6/1994 | Blankenhagen et al. . |
| 5,435,825 | 7/1995 | Kusui et al. . |
| 5,484,662 | 1/1996 | Rao . |
| 5,536,022 | 7/1996 | Sileo et al. . |

FOREIGN PATENT DOCUMENTS

| | | |
|---|---|---|
| 1085239 | 9/1980 | Canada . |
| O487273A1 | 5/1992 | European Pat. Off. . |
| 03064426 | 3/1991 | Japan . |
| 07126864 | 5/1995 | Japan . |
| 1352922 | 5/1974 | United Kingdom . |
| 1518649 | 7/1978 | United Kingdom . |
| 1519289 | 7/1978 | United Kingdom . |
| 2 218 710 | 11/1989 | United Kingdom . |
| WO 81/02587 | 9/1981 | WIPO . |

OTHER PUBLICATIONS

W. D. Kingery et al., "Introduction to Ceramics, Second Edition", p. 80, 1976.

*Primary Examiner*—Steven P. Griffin
*Attorney, Agent, or Firm*—Charles E. Rohrer

[57] ABSTRACT

Thermally sprayable powders for the formation of abradable seals and abradable seals formed by thermally spraying the powders include an alloyed metal phase material and a solid lubricant ceramic phase material. The alloyed metal phase material includes a major amount of a matrix metal which can be one or more of Ag or Cu, at least one melting point depressing metal which can be one or more of Si, B, Mn, or Al, and at least one oxidation resistant metal which can be one or more of Al, Cr, or Si. The solid lubricant ceramic phase is preferably hexagonal boron nitride, molybdenum sulphide, graphite, talc, bentonite or mica. Abradable seals formed by thermally spraying the powders are suitable for use with Ti alloy blades at temperatures up to 700° C.

63 Claims, 1 Drawing Sheet

THERMALLY SPRAYABLE POWDER MATERIALS HAVING AN ALLOYED METAL PHASE AND A SOLID LUBRICANT CERAMIC PHASE AND ABRADABLE SEAL ASSEMBLIES MANUFACTURED THEREFROM

FIELD OF THE INVENTION

This invention relates to abradable seals for use in rotating machinery.

BACKGROUND OF THE INVENTION

Abradable seals are used on the shrouds of compressors, particularly gas turbine engines of jets or land based rotary machinery, to assure efficient operation of the engines by minimizing gas leakage in both the compressor and turbine sections of the engines. Although the engine is typically designed and manufactured to precise dimensional tolerances, thermal and centrifugal expansion of rotating and stationary members makes zero clearances difficult to achieve. Thus, abradable seals are commonly employed on surfaces of the stationary member. Abradable seals allow penetration of rotating members, thereby establishing desired gas leakage control, by creating what is effectively a low tolerance seal. Abradable seals are distinct from rub surfaces in wet environments such as exist around oil bathed friction parts in engines, couplings and brakes.

A viable abradable seal is a compromise among many mutually exclusive physical properties. The seal should wear by disintegrating into fine particles rather than by tearing or spalling, and without causing substantial wear to the tips of the rotor blade. The seal should also be highly resistant to erosion and oxidation, as the hot, high velocity gas stream passing through the engine, laden with abrasive particulate matter, creates an environment that is both highly erosive and oxidative. Various attempts have been made to provide the property of abradability in the seal by manipulating the mechanical properties of the seal. Abradability may be achieved by using low sintering temperature during the seal formation process to provide a low density seal. The mechanical strength of the seal can also be reduced by the inclusion of friable non-metallic materials such as graphite or diatomaceous earth.

Alternatively, the quality of abradability may be a function of the melting point and melting characteristics of the seal. Where the melting point of the seal is somewhat above the operating temperature of the compressor, but below the melting temperature of the rotating member, heating caused by friction at the rub surface results in melting of the seal. As the rub surface temperature approaches the melting point of the seal, the seal loses mechanical strength and is readily abraded or displaced by the rotating member. The rotating member, having a substantially higher melting point, loses little mechanical strength, and can abrade the seal without damaging the rotor tip.

Modern gas turbine engines utilize rotor blades made up of titanium alloy, operating at temperatures up to about 700° C. Two main seal formulations are currently in commercial use, an AlSi-polyester seal (Metco 601—Trade Mark of Perkin-Elmer Corporation, New York) and a felt metal seal. The felt metal seals are typically formed from nickel based alloys. The seal consists of metal fibres which are sintered to produce a highly porous material (about 80% porous). The seal is applied by brazing. Neither commercially available seal is entirely satisfactory. The felt metal seal melts at temperatures substantially above 700° C., too high for the conditions of the Ti alloy blades. This results in substantial blade tip wear, the seal rub surface becomes very rough, creating an aerodynamically undesirable surface, and the seal sparks during rubbing. Sparking is particularly undesirable in turbine engines utilizing Ti alloy rotor blades as the potential for a Ti fire exists. Furthermore, the low density of the seal results in a undesirable amount of leakage.

An AlSi-polyester seal creates a rough rubbing surface, sparking, and the debris of the disintegrating seal tends to stick to the rotor blades and other engine hardware. The sticking of debris to the engine hardware is aerodynamically undesirable, and the debris-air mixture can be explosive.

The prior art describes many abradable seal compositions and structures. However, none of the seals described meet the dual requirements of being suitable for use with Ti alloy rotor blades at temperatures up to 700° C. and suitable for application by thermal spraying.

U.S. Pat. No. 3,053,694, U.S. Pat. No. 3,068,016 and U.S. Pat. No. 4,639,388 describe abradable seal structures in which the seal is either applied as a slurry or sintered into a metallic honeycomb matrix. Such seals cannot be deposited by thermal spraying.

U.S. Pat. No. 3,975,165, U.S. Pat. No. 3,985,513, U.S. Pat. No. 3,817,719 and U.S. Pat. No. 3,879,831 teach abradable seal compositions designed for use in the turbine sections of jet engines. Such seals are designed to withstand temperatures in excess of 1000° C. These seals therefore have melting points that are too high to provide abradability under 700° C. against titanium alloy blades.

Other prior art seals, such as those described in U.S. Pat. No. 5,049,450, U.S. Pat. No. 3,084,064 and U.S. Pat. No. 4,023,252 comprise compositions having melting points too low to provide seals with sufficient strength in the 345–700° C. operating temperature range.

As a result of these unresolved problems, the industry has sought alternative materials, especially for use in the 345 to 700° C. range. One present solution is to hard-tip the Ti alloy blades. This allows for the use of dense, hard, shroud seal coatings. However, hard tipping of the blades is expensive and can lower the fatigue life of the blades. The use of Ni alloy blades, which are harder than Ti alloy blades and need no hard tipping, is not practical as they are twice as heavy as Ti blades. Thus, a need remains for an abradable seal suitable for use with Ti alloy blades at temperatures up to about 700° C. that will cause minimal blade wear, sparking or debris sticking, will be highly resistant to erosion, oxidation and roughening of the rub surface, and will disintegrate into fine particles during rubbing.

SUMMARY OF THE INVENTION

The present invention provides a powder material for the formation of abradable seals. The powder is particularly useful in compressors having Ti alloy blades, including the compressor stages of gas turbine engines, operating at temperatures up to about 700° C. The powder material can be thermally sprayed. The powder material comprises an alloyed metal phase material in which at least one metal (and optionally more than one) is selected from each of three functional groups (termed first, second and third metal phase components), combined with a solid lubricant-type ceramic phase material.

The first metal phase component includes a major amount of a matrix metal, selected from Ag and Cu. By "major amount", as used herein and in the claims, is meant that the matrix metal component is included in the highest weight percent of the components in the alloyed metal phase material.

The second metal phase component is a melting point depressing metal selected from the group consisting of Si, B, Mn, and Al. The melting point depressing metal functions to reduce the melting point of the metal phase so that it is in the desired range.

The third metal phase component is an oxidation resistant metal selected from the group consisting of Al, Cr, and Si. This metal provides oxidation resistance in the seal to protect it from the oxidative effect of the hot gas stream passing through the engine.

The ceramic phase material is selected from the group of solid lubricant-type ceramic materials consisting of hexagonal boron nitride, molybdenum disulphide, graphite, talc, bentonite, mica or other layered silicate materials. Inclusion of the ceramic phase makes it possible to apply the seal by thermal spraying without obtaining exceedingly high densities (generally less than about 90% of theoretical density) in the seal and to make the metallic phase discontinuous and therefore more abradable.

The powder material, when formed into an abradable seal coating, preferably provides an abradable seal coating wherein the melting point of the alloyed metal phase is in the range of about 750–1000° C., more preferably 750–900° C., erodes at a rate no greater than 1.5 g/min, in accordance with the Erosion Resistance Test substantially as described in Example 1, and causes no more than 0.0005" (0.0127 mm) of wear to a titanium alloy test blade, in accordance with the Abradability Test substantially as described in Example 1.

The powder material is most preferably prepared as a mechanical mixture of particles of the alloyed metal phase material and the ceramic phase material. Alternatively, composite powders of the materials may be prepared by well known hydrometallurgical or spray drying techniques. The powder material preferably has a particle size range of between 10 and 200 μm, for application by thermal spraying.

Preferably, the powder material comprises at least 40 weight percent of the alloyed metal phase material and at least 10 weight percent of the solid lubricant-type ceramic material. Most preferably the solid lubricant-type material is hexagonal boron nitride.

More preferably, the alloyed metal phase material of the seal powder material includes at least one of the following melting point-depressing metals, included in the following weight range amounts based on the metal phase; Si (1–30%), B (1–20%), Mn (20–50%), and Al (30–50%); and at least one of the following oxidation-resistant metals based on the metal phase; Al (1–30%), Cr (1–30%) and Si (1–20%). The metal phase of the seal powder material may include as much as a total of 4 weight percent, based on the metal phase of one or more of Y, Ce, La, or rare earth metals, to provide additional oxidation resistance. Other elements or incidental impurities up to 3% maximum total weight, with no more than 1% of any single element or impurity, may be present.

In one preferred embodiment, an AgSi—BN seal powder material is provided wherein the amount of hexagonal boron nitride is preferably in the range of about 20–35 weight percent, more preferably about 27.5 weight percent, based on the total weight of the AgSi—BN powder, the remaining 72.5 weight percent being alloyed AgSi. The amount of Si, based on the total weight of the AgSi—BN powder is preferably in the range of 1.5–2.5 weight percent, more preferably 2.0 weight percent. The balance is Ag.

In another preferred embodiment, a CuMnAl—BN seal powder material is provided wherein the amount of hexagonal boron nitride is preferably in the range of about 45–55 weight percent, more preferably about 50 weight percent, based on the total weight of the powder material. The amount of Mn is preferably in the range of about 10–20 weight percent, more preferably about 15 weight percent. The amount of Al is preferably in the range of about 1.0–2.6 weight percent, more preferably about 1.8 weight percent, and the balance is Cu.

The present invention also extends to an abradable seal assembly comprising a substrate and any abradable seal powder material of the present invention deposited on the substrate by thermal spraying to form an abradable seal coating. The substrate will typically comprise the shroud or stator in a compressor, such as the compressor section of a jet engine. Preferably, the metal phase of the abradable seal coating deposited on the substrate has a melting point in the range of about 750–1000° C., more preferably in the range of about 750–900° C. The abradable seal coating provided also preferably erodes at a rate no greater than 1.5 g/min (Erosion Resistance Test as described herein) and causes no more than 0.0005" (0.0127 mm) of wear to a titanium alloy test blade (Abradability Test as described herein), and has a density greater than about 50% theoretical density.

Most prior art seals provide abradability on the basis of the mechanical properties of the seal. In the present invention, abradability is mainly a function of the melting point of the seal.

The present seal is designed to melt in a temperature range slightly above the maximum operating temperature of titanium alloy blades, but below their melting temperature. Temperatures in excess of the normal operating temperature of the engine are generated at the seal-Ti rotor blade rubbing interface as a result of the friction between the static seal and the moving blade during rubbing.

During rubbing, the temperature at the seal-rotor rubbing interface will increase until the melting point of the metallic phase is reached. The seal surface will begin to melt, losing mechanical strength and becoming highly abradable as it melts. Friction at the rubbing surface will become greatly reduced and the temperature at the rubbing surface therefore ceases to increase further. The Ti blade will still have high strength at the rubbing temperature and will not wear.

The appropriate melting point or range of the seal is governed by the selected application. If the melting point of the seal is too close to the maximum operating temperature of the engine, the entire seal could melt and result in total mechanical failure of the seal. In normal operation, the rubbing surface of the seal melts while the rest of the seal remains solid. At the other extreme, if the melting temperature of the seal is too high the Ti blade may begin to lose mechanical strength before the seal melts, resulting in excessive rotor blade wear.

DESCRIPTION OF THE PREFERRED EMBODIMENT

Figure 1:
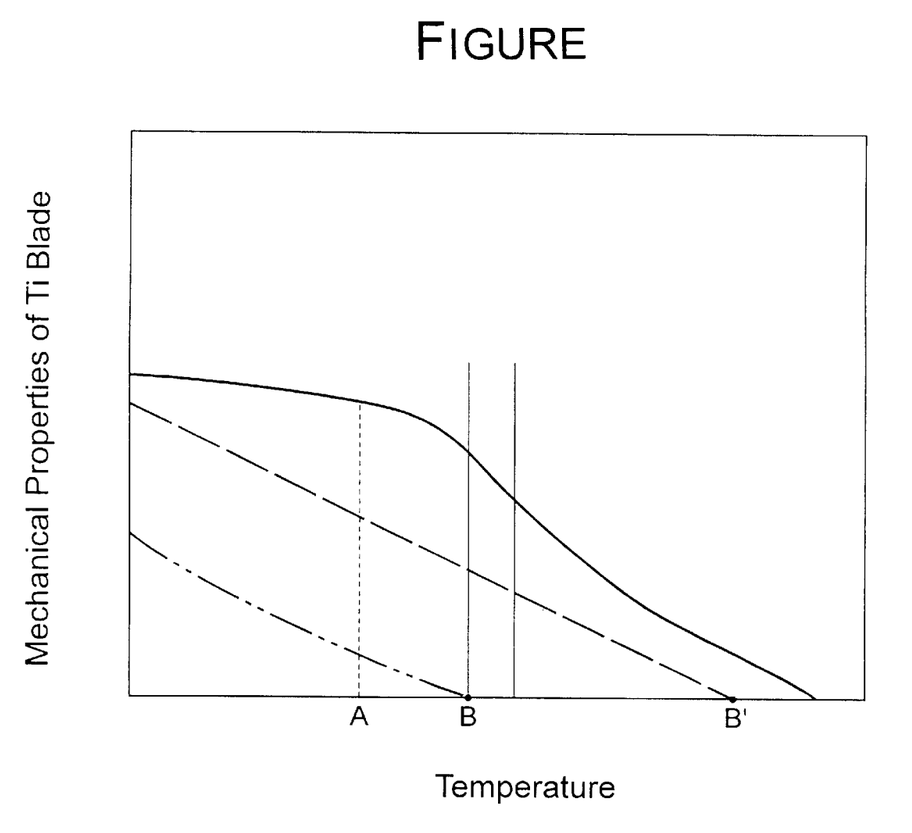
The FIGURE is a graph depicting the relationship between the mechanical strength of an abradable seal of the present invention (-.-), an unsatisfactory abradable seal (- - -), and the mechanical strength of a Ti alloy rotor blade (-) over a wide temperature range, the two solid vertical lines indicating the blade—seal interface temperature interval during rubbing.

The invention provides novel abradable seal powders useful for producing abradable seal assemblies suitable for use with Ti alloy blades at temperatures up to about 700° C.

that will cause minimal blade wear, sparking or debris sticking to the engine hardware, will be highly resistant to erosion, oxidation and roughening of the rub surface, and will disintegrate into fine particles during abrasion.

The seal assembly of the present invention is manufactured by thermally spraying a powder material, formed from an alloyed metallic phase material and a ceramic phase material, to form an abradable seal coating (or seal) onto a substrate. A ceramic phase material is included in the powder material to make it possible to apply the seal by thermal spraying without obtaining exceedingly high densities in the seal (50–90% theoretical densities are preferred) and to make the alloyed metallic phase discontinuous and therefore more abradable. The ceramic phase also serves a lubricating function in the seal.

Abradability of the seal within the operating temperature range is a function of the melting point and melting characteristics of the alloyed metallic phase of the seal. Although during normal operation, the tip of the Ti rotor blade does not contact the abradable seal bonded to the compressor casing, such contact may occasionally occur as a result of differential thermal and centrifugal expansion of the static and rotating members and due to vibration. Friction at the rotor blade tip/seal surface interface or rub surface results in heating of the seal and Ti rotor blade to temperatures in excess of the operating temperature within the compressor. Temperature at the rub surface can reach temperatures high enough to severely damage the blades.

Overheating of the blade during operation may result in excessive blade wear or damage. Referring now to the curve shown in the FIGURE, the mechanical properties of Ti alloy blades are plotted against increasing temperature, showing that the mechanical properties of the blade, such as ultimate tensile strength, decrease rapidly. In order to decrease or eliminate rotor blade tip wear, the mechanical strength of the blade material should be substantially greater than the strength of the abradable seal at any temperature point. An appropriate relationship between blade strength and seal strength is set forth in the FIGURE. Point A represents the maximum useable temperature of the rotor blade and point B the melting point of the seal. As the strength of the rotor blade is always substantially greater than that of the seal up to temperature B, during contact the seal will be abraded with little wear caused to the rotor blade tip.

As the rubbing surface reaches temperature point B in the FIGURE, the seal surface is a mixture of liquified or partially liquified metallic phase and lubricating, yet solid, ceramic phase. The temperature at the rub surface of the seal is much greater than that within the seal or at the seal surface bonded to the substrate. Thus, even though the seal at the rub surface may have reached a sufficient temperature to melt and therefore lose all mechanical strength, the rest of the seal remains solid and retains its structural integrity.

The function of the abradable seal of the present invention is analogous to that of an electrical fuse. When the load on the rotor blade due to the friction of rubbing against the seal becomes too high, the rubbing temperature increases until the melting point of the seal is reached. The seal then melts, losing mechanical strength, thus reducing rubbing friction. Without further energy input due to rubbing friction, the temperature of the blade does not increase further. At temperature point B in the FIGURE, the seal surface has liquified and is no longer a source of rubbing friction. Therefore, the temperature of the rotor blade will not increase substantially past the temperature at point B. At point B the rotor blade retains substantial mechanical strength and is not subjected to damage.

The difference between temperature A, the maximum useable temperature of the rotor blade, and temperature B, the melting point of the seal, depends on the safety margin required for a particular application. If temperature B is too close to temperature A, overheating during operation could result in a substantial melting of the entire seal structure, resulting in failure of the seal. If temperature B is too great relative to temperature A (see for example point B' in the FIGURE), the Ti blade may lose too much strength before the seal melts, which may result in rotor blade wear. Preferably, temperature B should not be more than 500° C. above temperature A. More preferably, temperature B is between 50 and 250° C. above temperature A. The mechanical properties of the rotor blade in the temperature interval A-B are preferably substantially greater than the mechanical properties of the seal in this temperature range. Where both these conditions are satisfied, the blade should rub without being substantially damaged by the seal.

In addition to providing satisfactory abradability within the desired temperature range, the seal must also be sufficiently resistant to erosion that it can withstand the high velocity gas stream laden with abrasive particulate matter passing through the compressor. The seal must also be sufficiently resistant to the oxidative effects of the hot gas stream. The present invention meets these diverse requirements by providing a seal having an alloyed metal phase material comprising three components, a matrix metal, a melting point depressing metal, and a oxidation resistant metal. These metals are alloyed together and a lubricating ceramic phase is added in proportions providing the desired erosion and abradability in the desired temperature range. The melting point of the seal is of significance as the abradability of the seal is essentially a function of the melting point of the metallic phase.

Melting points of various metal alloys can be determined from phase diagrams. Phase diagrams provide the "solidus temperature" (the temperature at which the first liquid appears) and the "liquidus temperature" (the temperature at which the alloy is entirely liquid) for alloys containing varying weight percent amounts of the constituent metals. Exemplary sources of phase diagrams for metal alloys include "Binary Alloy Phase Diagrams", Second Edition, Vol. 1–3, American Society for Metals, Editor in Chief—T. B. Massalski, and "Alloy Phase Diagrams", ASM Handbook, Vol. 3, American Society for Metals International, Editor—Hugh Baker, the teachings of which are incorporated herein by reference.

The inventors have determined that the matrix metal component of the metallic phase material should be selected from the group consisting of Ag and Cu. These metals have sufficiently low melting points, when alloyed with melting point depressant and oxidative resistive metals, to provide a soft metal phase having the melting point properties and range set out in the FIGURE, for particular application with Ti alloy blades. The melting point depressing metal is preferably selected from the group consisting of Si, B, Mn, and Al, with Si, Mn and Al being most preferred. The oxidation resistant metal is preferably selected from the group consisting of Al, Cr, and Si, with Al and Si being most preferred.

A solid lubricant type ceramic phase material is included in the abradable seal powder material to increase lubricity and provide adjustable porosity and density.

It has been determined that for operation with Ti alloy rotor blades in the 400 to 700° C. temperature range, the preferred melting point of the alloyed metal phase of the seal powder material is in the range of about 750–1000° C. and more preferably in the range of about 750–900° C.

It is difficult to define the important qualities of abradability and erosion resistance on the basis of known properties of other metal/ceramic materials. Rather, reference must be made to tests which, as closely as possible, simulate the conditions experienced in a working compressor. As used herein, an Abradability Test and an Erosion Resistance Test shall mean tests performed under substantially the same conditions set forth in Example 1 herein. It has been determined, as further explained in Table 1, that for use with Ti alloy rotor blades in the 400–700° C. temperature range, an appropriate abradable seal should erode at a rate no greater than 1.5 g/min (Erosion Resistance Test) and causes no more than 0.0005" (0.0127 mm) wear to a Ti alloy blade (Abradability Test).

The inventors have discovered that an abradable seal within the above parameters can be formed from a thermally sprayable powder material comprising at least 40 weight percent of an alloyed metal phase including at least one of the metals from each of the aforementioned groups of matrix metals, melting point depressing metals, and oxidation resistant metals, and at least 10 weight percent of a solid lubricant type ceramic material, provided that if the matrix metal is Ag, the melting point depressing metal is not solely Mn. The solid lubricant type ceramic material may be hexagonal boron nitride (BN), molybdenum disulphide, graphite, talc, bentonite or mica. More preferably, the solid lubricant material is hexagonal boron nitride, graphite or molybdenum sulphide, most preferably, hexagonal boron nitride.

The alloyed metal phase of the powder material preferably contains at least one of the melting point depressing metals in the following percent weight range amounts, based on the metal phase: Si (1–30%), B (1–20%), Mn (20–50%), and Al (30–50%). The metal phase also preferably contains one of the oxidation resistant metals, included in the following weight percent range amounts, based on the metal phase: Al (1–30%), Cr (1–30%), and Si (1–20%).

The metal phase of the abradable seal powder material may also include up to 4% of one or more of Y, Ce, La, or rare earth metals. These metals provide additional oxidative resistance. Other elements or incidental impurities might be present in up to 3% maximum total weight, with no more than 1% of any one element or impurity.

One preferred seal powder material is an AgSi—BN powder wherein the matrix metal is Ag, both the melting point depressing metal and the oxidation resistant metal is Si, and the solid lubricating type ceramic material is hexagonal boron nitride. Preferably the amount of hexagonal boron nitride is in the range of about 20–35 weight percent based on the total weight, more preferably 27.5 weight percent, the amount of Si is in the range of about 1.5–2.5 weight percent, more preferably about 2.0 weight percent, and the balance is Ag.

In another preferred embodiment a CuMnAl—BN seal powder material is provided wherein the matrix metal is Cu, the melting point depressing metal is Mn, and the oxidation resistant metal is Al, and the solid lubricant type ceramic material is hexagonal boron nitride. Preferably, the amount of hexagonal boron nitride is in the range of about 45–55 weight percent based on the total weight, more preferably about 50 weight percent, the amount of Mn is in the range of about 10–20 weight percent, more preferably about 15 weight percent, the amount of Al is in the range of about 1–2.6 weight percent, more preferably about 1.8 weight percent, and the balance is Cu.

The seal powder materials of the present invention are produced by mechanically mixing the metal and the ceramic powders. However, composite powders in which one powder particle contains both the metal and the ceramic phase can also be prepared by spray drying, hydrometallurgical or other techniques. Preferably, the particle size of the powder most suitable for thermal spraying is in the range of about 10–200 micrometers.

To form an abradable seal assembly in accordance with the present invention, the above described powder materials are thermally sprayed onto a substrate such as a compressor casing or stator to form an abradable seal coating. Preferably, a bond coat is first deposited onto the substrate to aid the adhesion of the abradable seal coating. Bond coats are well known in the art. Exemplary bond coats include Metco 450NS (Trade mark of Perkin-Elmer), which is an 80% Ni, 20% Al coating, nickel chromium coatings, and nickel chromium aluminum yttrium coatings.

Thermal spraying involves the softening or melting of a heat fusible material such as metal or ceramic by heat, and propelling the softened or melted material in particulate form against a surface which is to be coated. The heated particles strike the surface where they are cooled and bonded thereto. A conventional thermal spray gun may be used for the purpose of both heating and propelling the particles.

A thermal spray gun normally utilizes a combustion or plasma flame to produce the heat for melting of the powder particles. In a powder type combustion thermal spray gun, the carrier gas, which entrains and transports the powder, is typically an inert gas such as nitrogen. In a plasma spray gun, the primary plasma gas is generally nitrogen or argon. Hydrogen or helium is usually added to the primary gas, and the carrier gas is generally the same as the primary plasma gas. A good general description of thermal spraying is provided in U.S. Pat. No. 5,049,450 (Dorfman et al).

Generally the plasma spray parameters which are varied to adjust the density of the abradable seal coating are the powder flow rate and the plasma current. The lower powder flow rate and higher plasma current result in a higher density seal because the powder particles are heated to a higher temperature.

During thermal spraying the weight percent amounts of the constituent elements in the finished seal coating differs from the weight percent amounts of the constituent elements in the thermally sprayable seal powders. In general, the percentage of the ceramic phase material is lowered in the final seal, compared to its percentage in the initial powder. The ceramic phase material does not deposit as well as the metal phase material, since the former remains solid during deposition, while the metal phase is softened or liquified. The ceramic powder particles are entrapped by the metallic particles during spraying. Also, some oxides form during thermal spraying, changing the composition of the final seal somewhat. Preferably, in the abradable seal coating, the alloyed metal phase material comprises at least 75 weight percent and the solid lubricant ceramic phase material comprises at least 10 weight percent. In a preferred embodiment, the abradable seal coating is formed by thermally spraying the AgSi—BN powder described above onto a substrate to form a final seal coating having an amount of hexagonal boron nitride in range of amount 10–20 weight percent, based on the total weight of the seal coating, an amount of Si is in the range of about 1–5 weight percent, the balance being Ag. In a particularly preferred embodiment, the AgSi—BN powder is thermally sprayed onto a substrate to form a final coating having an amount of hexagonal boron nitride in the range of about 10–20 weight percent, based on the total weight of the abradable seal coating, an amount of Si in the range of about 2.0–2.8 weight percent, based on the total weight of the abradable seal coating, and the balance being Ag. In another preferred embodiment, the seal assembly is formed by thermally spraying the CuMnAl—BN powder described above onto a substrate to form an abradable seal coating having an amount of hexagonal boron nitride in the seal coating in the range of about 10–20 weight percent, based on the total weight of the seal coating, an amount of Mn of about 20–30 weight percent, an amount of Al of about 1–5 weight percent, the balance being Cu.

The invention is further illustrated by the following non-limiting examples.

EXAMPLE 1
AgSi—BN Abradable Seal

Alloyed metal AgSi particles comprising 97.3 weight percent Ag and 2.7 weight percent Si were produced by inert gas atomization. An ingot of AgSi alloy (3.1% Si, balance Ag) was induction melted under a protective atmosphere of nitrogen at 17.0 bar and atomized at 970° C. The resulting powder comprised spherical particles having an average diameter of approximately 44 $\mu$m. The powder was screened on a 44 $\mu$m screen and the fraction passing through the screen, having an average diameter of approximately 28 $\mu$m was used for thermal spraying. The melting point of the AgSi powder (metal phase) was 840° C. as measured using differential thermal analysis equipment.

The AgSi—BN powder mixture for thermal spraying was prepared by mechanically mixing 72.5 weight percent of the above mentioned AgSi powder with 27.5 weight percent hexagonal boron nitride powder having essentially a particle size of −150+75 $\mu$m.

A low carbon steel substrate was prepared with a Metco 450 NS bond coat (an 80/20 nickel coated aluminum bond coat from Metco, a division of Perkin Elmer).

A powder was sprayed with a Metco type 9MB plasma spray gun (Metco, a division of Perkin Elmer) with a 732 nozzle under the following spray parameters:

| | |
|---|---|
| Powder Flow Rate | 60 g/min |
| Spray Distance | 3" (7.6 cm) |
| Current | 500 amps |
| Voltage | 70 volts |
| Argon Pressure | 100 psi (690 kPa) |
| Argon Flow Rate | 180 l/min. |
| Hydrogen Pressure | 50 psi (345 kPa) |
| Hydrogen Flow Rate | 10 l/min. |
| Feeder | 4 MP |
| Vibrator Pressure | 25 psi (172 kPa) |
| Gun Travel Speed | 60 ft/min (0.3 m/s) |

The resulting seal coating was 0.100" (0.254 cm) thick and had the following characteristics:

| | |
|---|---|
| Density | 4.86 g/cm$^3$ |
| Hardness on the Rockwell Hardness Scale | R15Y = 57 (ASTM Standard) |
| Ultimate Tensile Strength (UTS)* | 408 psi (2813 kPa) |
| Boron Nitride Content | 12.1 weight percent |

*The UTS test was conducted by gluing the end of an uncoated cylinder to the surface of the coating and pulling the two cylinders apart in a tensile machine until the coating fractured. The UTS test is used as an indication of abradability, as is customary in the art. A low UTS value indicates better abradability.

The erosion resistance of the AgSi—BN seal was tested by simulating the effect of particulate matter ingested by an operating engine gas turbine engine. Testing substantially in conformance with this description is referred to herein and in the claims as an Erosion Resistance Test. Grade SIL-3 (Bruderheim, Alberta, Canada) silica sand was projected at the seal under the following test conditions:

| | |
|---|---|
| Sand Feed Rate | 32 g/min |
| Air Flow Rate | 151 l/min |
| Nozzle to Sample Distance | 10 cm |
| Air Nozzle Internal Diameter | 0.1875" (0.476 cm) |
| Test Temperature | 75° F. (24° C.) |
| Test Duration | 1 minute |

The seal sample was perpendicular to the flow of the sand particles.

Following the test, the weight loss of the seal was measured and the erosion resistance described as seal weight loss in grams per minute during exposure to the above test conditions.

The seal abradability performance was tested at Solar Turbines Inc., San Diego, Calif. Testing substantially in conformance with this description is referred to herein and in the claims as an Abradability Test. The test conditions were:

| | |
|---|---|
| Test Temperature | 21° C. |
| Blade Tip Speed | 1150 feet per second (351 m/s) |
| Number of Blades Rubbing | 1 |
| Blade Composition (Weight percent) | Al (6%), Sn (2%), Zr (4%), Mo (2%), Ti (balance) |
| Incursion Rate | 0.010 inches per second (0.025 cm/s) |
| Blade Width | 1.226" (3.114 cm) |
| Blade Thickness | 0.036" (0.091 cm) |
| Blade Wear | Normalized to obtain 0.020" (0.508 mm) deep groove in the seal |
| Blade Seal Interaction | 0.040" (1.02 mm). |

In addition to measuring abradability, the above test also determined whether the seal would spark during rubbing, whether debris would adhere to hardware after rubbing, and would indicate the seal surface finish after rubbing.

Results of the Erosion Resistance and Abradability Tests are discussed following Example 2 below.

EXAMPLE 2
CuMnAl—BN Abradable Seal

Alloyed metal CuMnAl particles were produced by inert gas atomization. An ingot of CuMn (31% Mn, 69% Cu) and corresponding weight of Al ingot were used as starting materials for melting. In preparation for atomization, the ingots were induction melted in air under a charcoal covering. The resulting liquid alloy was atomized at a temperature between 1070–1100° C. using nitrogen gas at 20.7 bar. The resulting powder comprised particles of which 100% were below 150 $\mu$m in diameter and 67.6 percent of which were below 44 $\mu$m in diameter. The powder was screened on a 44 $\mu$m screen and the fraction passing through the screen having an average particle diameter of 32 $\mu$m was used for thermal spraying.

The metal phase comprised 30.2 weight percent Mn, 3.4 weight percent Al, the balance being Cu. The melting point of the metal phase was 870° C., as measured using differential thermal analysis equipment.

The powder mixture for thermal spraying was prepared by mechanically mixing 50 weight percent of the CuMnAl powder described above and 50 weight percent hexagonal boron nitride powder having particle size of approximately −150+75 $\mu$m. The thermal spray parameters were identical to those in Example 1 with the exception that the voltage used was 80 volts.

The resulting seal was 0.100" (0.254 cm) thick and had the following properties:

| | |
|---|---|
| Density | 3.50 g/cm$^3$ |
| Hardness on the Rockwell Scale | R15Y = 56 |
| Ultimate Tensile Strength | 780 psi (5378 kPa) |
| Boron Nitride Content | 14.2 weight percent |

Table 1 provides a summary of the test results of the seal coatings of Examples 1 and 2 compared with the test results for four known commercial seals.

TABLE 1

Abradable Seat Properties Summary

| Seat Composition | Status | Abradability Test* | Sparking During Rubbing | Finish After Rubbing | Debris Sticking to Hardware After Rubbing | Erosion Resistance Test (g/min) |
|---|---|---|---|---|---|---|
| AgSi - BN | Example 1 | Wear 0.00015" 0.00381 mm | None | Smooth | No | 1.10 |
| CuMnAl - BN | Example 2 | Wear 0.00016" 0.00406 mm | None | Smooth | No | 0.51 |
| 75 Ni/C 25 | Used in jet engines | Wear 0.01300" 0.3302 mm | Heavy | Smooth | No | 1.50 |
| NiCrAl/Bentonite (Metco 312) | Used in jet engines | Wear 0.11900" 3.0226 mm | Heavy | Rough | No | 0.15 |
| Felt Metal | Used in jet engines | Wear 0.02900" 0.7366 mm | Heavy | Very Rough | No | 0.08 |
| AlSi-Polyester (Metco 601) | Used in jet engines | Pick-up 0.00050" 0.0127 mm | Heavy | Rough | Heavy | 0.05 |

*The titanium alloy blade wear or pick-up was normalized. The data is for seal wear of 0.020" = 0.508 mm.

The seals of the present invention are shown to be equal or superior to the prior art seals tested on almost all test criteria. With both the AgSi—BN and CuMnAl—BN seals, the seal finish after rubbing was smooth and there was no debris sticking to the rotating and stationary members after rubbing. Further, the seals of the prevent invention caused no sparking during rubbing.

In order to determine the acceptable value for erosion resistance the reference was made to 75% Ni/25% C abradable seal currently used in jet engines. As set forth in Table 1, the 75% Ni/25% C seal eroded at a rate of 1.5 g/min during the Erosion Resistance Test. This was the maximum rate of erosion noted in any of the four commercially used seals and was therefore established as the maximum permissible rate of erosion.

The abradability of both seals (AgSi—BN, CuMnAl—BN) was excellent. The blade length loss measurement was within the experimental error of the measurement in the Abradability Test indicating essentially "no wear" of the blade during rubbing.

Both seals of the present invention have erosion resistance within the acceptable range.

All publications mentioned in this specification are indicative of the level of skill of those skilled in the art to which this invention pertains. All publications are herein incorporated by reference to the same extent as if each individual publication was specifically and individually indicated to be incorporated by reference.

The terms and expressions in this specification are used as terms of description and not of limitation. There is no intention, in using such terms and expressions, of excluding equivalents of the features illustrated and described, it being recognized that the scope of the invention is defined and limited only by the claims which follow.

What is claimed is:

1. A powder material for the formation of an abradable seal coating, consisting essentially of:

(A) an alloyed metal phase material having a melting point in the range of about 750–1000° C., the alloyed metal phase material including at least one of the metals from each of the following groups:

(i) a major amount of a matrix metal selected from the group consisting of Ag and Cu;
   (ii) a melting point-depressing metal selected from the group consisting of Si, B, Mn and Al;
   (iii) an oxidation-resistant metal selected from the group consisting of Al, Cr and Si;

(B) a solid lubricant ceramic phase material; and, optionally,
   (C) as much as a total of 4 weight percent, based on the alloyed metal phase material, of one or more of Y, Ce, La, or rare earth metals;

the powder material, when thermally sprayed, forming an abradable seal coating.

2. The powder material as set forth in claim 1, wherein the alloyed metal phase material comprises at least 40 weight percent, based on the total weight of the powder material, and the solid lubricant ceramic phase material comprises at least 10 weight percent, based on the total weight of the powder material, and wherein, if the matrix metal is Ag, the melting point-depressing metal is not solely Mn.

3. The powder material as set forth in claim 2, wherein the solid lubricant ceramic phase material is selected from the group consisting of hexagonal boron nitride, molybdenum disulphide, graphite, talc, bentonite, mica or other layered silicate materials.

4. The powder material as set forth in claim 3, which forms an abradable seal coating which erodes at a rate no greater than 1.5 g/min when tested in accordance with an erosion resistance test comprising projecting a grade SIL-3 (Bruderheim, Alberta, Canada) silica sand at the seal coating from an air nozzle having an internal diameter of 0.476 cm, the distance from the nozzle to the seal coating being 10 cm, at a sand feed rate of 32 g/min, an air flow rate of 151 l/min, a temperature of 24° C., for a duration of 1 minute, the seal coating being positioned perpendicular to the direction of the flow of sand particles, and which causes no more than 0.0127 mm of wear to a titanium alloy blade when tested in accordance with an abradability test comprising contacting the seal coating with a blade comprising 6% Al, 2% Sn, 4% Zr, 2% Mo, the balance Ti, the blade having a width of 3.114 cm, a thickness of 0.091 cm, and normalized to obtain a 0.508 mm deep groove in the seal coating, at a blade tip speed of 351 m/s, an incursion rate of 0.25 cm/s, the blade and the seal coating interacting over a distance of 1.02 mm.

5. The powder material as set forth in claim 4, wherein the solid lubricant ceramic phase material is selected from the group consisting of hexagonal boron nitride, graphite and molybdenum disulphide.

6. The powder material as set forth in claim 4, wherein the melting point of the alloyed metal phase material is in the range of about 750–900° C.

7. The powder material as set forth in claim 4, wherein the solid lubricant ceramic phase material is hexagonal boron nitride.

8. The powder material as set forth in claim 4, wherein the alloyed metal phase material includes:
  (A) at least one of said melting point-depressing metals, included in the following percent weight range amounts, based on the alloyed metal phase material; Si (1–30%), B (1–20%), Mn (20–50%), and Al (30–50%); and,
  (B) at least one of said oxidation-resistant metals, included in the following percent weight range amounts, based on the alloyed metal phase material; Al (1–30%), Cr (1–30%), and Si (1–20%).

9. The powder material as set forth in claim 8, wherein the solid lubricant ceramic phase material is hexagonal boron nitride.

10. The powder material as set forth in claim 9, wherein the matrix metal is Ag and the melting point-depressing metal and the oxidation-resistant metal is Si.

11. The powder material as set forth in claim 10, wherein the amount of hexagonal boron nitride is in the range of about 20–35 weight percent, based on the total weight of the powder material, the amount of Si is in the range of about 1.5–2.5 weight percent, based on the total weight of the powder material, and the balance of the powder material is Ag.

12. The powder material as set forth in claim 11, wherein the amount of hexagonal boron nitride is about 27.5 weight percent, based on the total weight of the powder material, the amount of Si is about 2.0 weight percent, based on the total weight of the powder material, and the balance of the powder material is Ag.

13. The powder material as set forth in claim 12, wherein the particle size of the powder material is in the range of about 10—200 $\mu$m.

14. The powder material as set forth in claim 9, wherein the matrix metal is Cu, the melting point-depressing metal is Mn, and the oxidation-resistant metal is Al.

15. The powder material as set forth in claim 14, wherein the amount of hexagonal boron nitride is in the range of about 45–55 weight percent, based on the total weight of the powder material, the amount of Mn is in the range of about 10–20 weight percent, based on the total weight of the powder material, the amount of Al is in the range of about 1–2.6 weight percent, based on the total weight of the powder material, and the balance of the powder material is Cu.

16. The powder material as set forth in claim 15, wherein the amount of hexagonal boron nitride is about 50 weight percent, based on the total weight of the powder material, the amount of Mn is about 15 weight percent, based on the total weight of the powder material, the amount of Al is about 1.8 weight percent, based on the total weight of the powder material, and the balance of the powder material is Cu.

17. The powder material as set forth in claim 16, wherein the particle size of the powder material is in the range of about 10–200 $\mu$m.

18. The powder material as set forth in claim 4, in the form of a mechanical mixture of the alloyed metal phase material and the solid lubricant ceramic phase material.

19. The powder material as set forth in claim 4, in the form of a composite powder of the alloyed metal phase material and the solid lubricant ceramic phase material.

20. The powder material as set forth in claim 2 wherein the melting point of the alloyed metal phase material is in the range of about 750–900° C.

21. The powder material as set forth in claim 20, wherein the solid lubricant ceramic phase material is hexagonal boron nitride.

22. An abradable seal assembly comprising:
  a substrate, and
  an abradable seal coating deposited on the substrate by thermal spraying, the abradable seal coating consisting essentially of:
    (A) an alloyed metal phase material having a melting point in the range of about 750–1000° C., the alloyed metal phase material including at least one of the metals from each of the following groups:
      (i) a major amount of a matrix metal selected from the group consisting of Ag and Cu;
      (ii) a melting point-depressing metal selected from the group consisting of Si, B, Mn and Al;
      (iii) an oxidation-resistant metal selected from the group consisting of Al, Cr and Si;
    (B) a solid lubricant ceramic phase material; and, optionally,
    (C) as much as a total of 4 weight percent, based on the alloyed metal phase material, of one or more of Y, Ce, La, or rare earth metals.

23. The seal assembly as set forth in claim 22, wherein the alloyed metal phase material comprises at least 75 weight percent, based on the total weight of the abradable seal coating, and the solid lubricant ceramic phase material constitutes at least 10 weight percent, based on the total weight of the abradable seal coating, wherein, if the matrix metal is Ag, the melting point-depressing metal is not solely Mn, and wherein the abradable seal coating has a theoretical density greater than about 50%.

24. The seal assembly as set forth in claim 23, wherein the solid lubricant ceramic phase material is selected from the group consisting of hexagonal boron nitride, molybdenum disulphide, graphite, talc, bentonite, mica or other layered silicate materials.

25. The seal assembly as set forth in claim 24, wherein the abradable seal coating erodes at a rate no greater than 1.5 g/min when tested in accordance with an erosion resistance test comprising projecting a grade SIL-3 (Bruderheim, Alberta, Canada) silica sand at the seal coating from an air nozzle having an internal diameter of 0.476 cm, the distance from the nozzle to the seal coating being 10 cm, at a sand feed rate of 32 g/min, an air flow rate of 151 I/min, a temperature of 24° C., for a duration of 1 minute, the seal coating being positioned perpendicular to the direction of the flow of sand particles, and which causes no more than 0.0127 mm of wear to a titanium alloy blade when tested in accordance with an abradability test comprising contacting the seal coating with a blade comprising 6% Al, 2% Sn, 4% Zr, 2% Mo, the balance Ti, the blade having a width of 3.114 cm, a thickness of 0.091 cm, and normalized to obtain a 0.508 mm deep groove in the seal coating, at a blade tip speed of 351 m/s, an incursion rate of 0.25 cm/s, the blade and the seal coating interacting over a distance of 1.02 mm.

26. The seal assembly as set forth in claim 25, wherein the solid lubricant ceramic phase material is selected from the group consisting of hexagonal boron nitride, molybdenum disulphide and graphite.

27. The seal assembly as set forth in claim 26, wherein the alloyed metal phase material of the seal coating has a melting point in the range of about 750–900° C.

28. The seal assembly as set forth in claim 27, wherein the solid lubricant ceramic phase material is hexagonal boron nitride.

29. The seal assembly as set forth in claim 25, wherein the alloyed metal phase material of the seal coating has a melting point in the range of about 750–900° C.

30. The seal assembly as set forth in claim 25, wherein the solid lubricant ceramic phase material is hexagonal boron nitride.

31. The seal assembly as set forth in claim 25, wherein the alloyed metal phase material includes:
   (A) at least one of said melting point-depressing metals, included in the following percent weight range amounts, based on the alloyed metal phase material; Si (1–30%), B (1–20%), Mn (20–50%), and Al (30–50%); and,
   (B) at least one of said oxidation-resistant metals, included in the following percent weight range amounts, based on the alloyed metal phase material; Al (1–30%), Cr (1–30%), and Si (1–20%).

32. The seal assembly as set forth in claim 31, wherein the solid lubricant ceramic phase material is hexagonal boron nitride.

33. The seal assembly as set forth in claim 32, wherein the matrix metal is Ag and the melting point-depressing metal and the oxidation-resistant metal is Si.

34. The seal assembly as set forth in claim 33, wherein the amount of hexagonal boron nitride is in the range of about 10–20 weight percent, based on the total weight of the abradable seal coating, the amount of Si is in the range of about 2.0–2.8 weight percent, based on the total weight of the abradable seal coating, and the balance of the abradable seal coating is Ag.

35. The seal assembly as set forth in claim 32, wherein the matrix metal is Cu, the melting point-depressing metal is Mn, and the oxidation-resistant metal is Al.

36. The seal assembly as set forth in claim 35, wherein the amount of hexagonal boron nitride is in the range of about 10–20 weight percent, based on total weight of the abradable seal coating, the amount of Mn is about 20–30 weight percent, based on the total weight of the abradable seal coating, the amount of Al is about 1–5 weight percent, based on the total weight of the abradable seal coating, and the balance of the abradable seal coating is Cu.

37. The seal assembly as set forth in claim 25, wherein the substrate is a shroud of a gas turbine engine.

38. A powder material for the formation of an abradable seal coating, comprising:

(A) an alloyed metal phase material having a melting point in the range of about 750–1000° C., the alloyed metal phase material including at least one of the metals from each of the following groups:
   (i) a major amount of a matrix metal selected from the group consisting of Ag and Cu;
   (ii) a melting point-depressing metal selected from the group consisting of Si, B, Mn and Al;
   (iii) an oxidation-resistant metal selected from the group consisting of Al, Cr and Si; and
(B) a solid lubricant ceramic phase material comprising hexagonal boron nitride, the powder material, when thermally sprayed, forming an abradable seal coating.

39. A powder material for the formation of an abradable seal coating, consisting essentially of:
(A) at least 40 weight percent, based on the total weight of the powder material, of an alloyed metal phase material having a melting point in the range of about 750–1000° C., the alloyed metal phase material including at least one of the metals from each of the following groups:
   (i) a major amount of a matrix metal selected from the group consisting of Ag and Cu;
   (ii) a melting point-depressing metal selected from the group consisting of Si, B, Mn and Al;
   (iii) an oxidation-resistant metal selected from the group consisting of Al, Cr and Si;
   wherein, if the matrix metal is Ag, the melting point-depressing metal is not solely Mn,
(B) at least 10 weight percent, based on the total weight of the powder material, of a solid lubricant ceramic phase material comprising hexagonal boron nitride; and, optionally,
(C) as much as a total of 4 weight percent, based on the alloyed metal phase material, of one or more of Y, Ce, La, or rare earth metals, the powder material, when thermally sprayed, forming an abradable seal coating.

40. The powder material as set forth in claim 39, which forms an abradable seal coating which erodes at a rate no greater than 1.5 g/min when tested in accordance with an erosion resistance test comprising protecting a grade SIL-3 (Bruderheim, Alberta, Canada) silica sand at the seal coating from an air nozzle having an internal diameter of 0.476 cm, the distance from the nozzle to the seal coating being 10 cm, at a sand feed rate of 32 g/min, an air flow rate of 151 I/min, a temperature of 24° C., for a duration of 1 minute, the seal coating being positioned perpendicular to the direction of the flow of sand particles, and which causes no more than 0.0127 mm of wear to a titanium alloy blade when tested in accordance with an abradability test comprising contacting the seal coating with a blade comprising 6% Al, 2% Sn, 4% Zr, 2% Mo, the balance Ti, the blade having a width of 3.114 cm, a thickness of 0.091 cm, and normalized to obtain a 0.508 mm deep groove in the seal coating, at a blade tip speed of 351 m/s, an incursion rate of 0.25 cm/s, the blade and the seal coating interacting over a distance of 1.02 mm.

41. The powder material as set forth in claim 40, wherein the melting point of the alloyed metal phase material is in the range of about 750–900° C.

42. The powder material as set forth in claim 40, wherein the alloyed metal phase material includes:
   (A) at least one of said melting point-depressing metals, included in the following percent weight range amounts, based on the alloyed metal phase material; Si (1–30%), B (1–20%), Mn (20–50%), and Al (30–50%); and, (B) at least one of said oxidation-resistant metals, included in the following percent weight range amounts, based on the alloyed metal phase material; Al (1–30%), Cr (1–30%), and Si (1–20%).

43. The powder material as set forth in claim 42, wherein the matrix metal is Ag and the melting point-depressing metal and the oxidation-resistant metal is Si.

44. The powder material as set forth in claim 43, wherein the amount of hexagonal boron nitride is in the range of about 20–35 weight percent, based on the total weight of the powder material, the amount of Si is in the range of about 1.5–2.5 weight percent, based on the total weight of the powder material, and the balance of the powder material is Ag.

45. The powder material as set forth in claim 44, wherein the amount of hexagonal boron nitride is about 27.5 weight percent, based on the total weight of the powder material, the amount of Si is about 2.0 weight percent, based on the total weight of the powder material, and the balance of the powder material is Ag.

46. The powder material as set forth in claim 45, wherein the particle size of the powder material is in the range of about 10–200 μm.

47. The powder material as set forth in claim 42, wherein the matrix metal is Cu, the melting point-depressing metal is Mn, and the oxidation-resistant metal is Al.

48. The powder material as set forth in claim 47, wherein the amount of hexagonal boron nitride is in the range of about 45–55 weight percent, based on the total weight of the powder material, the amount of Mn is in the range of about 10–20 weight percent, based on the total weight of the powder material, the amount of Al is in the range of about 1–2.6 weight percent, based on the total weight of the powder material, and the balance of the powder material is Cu.

49. The powder material as set forth in claim 48, wherein the amount of hexagonal boron nitride is about 50 weight percent, based on the total weight of the powder material, the amount of Mn is about 15 weight percent, based on the total weight of the powder material, the amount of Al is about 1.8 weight percent, based on the total weight of the powder material, and the balance of the powder material is Cu.

50. The powder material as set forth in claim 49, wherein the particle size of the powder material is in the range of about 10–200 μm.

51. The powder material as set forth in claim 40, in the form of a mechanical mixture of the alloyed metal phase material and the solid lubricant ceramic phase material.

52. The powder material as set forth in claim 40, in the form of a composite powder of the alloyed metal phase material and the solid lubricant ceramic phase material.

53. The powder material as set forth in claim 39 wherein the melting point of the alloyed metal phase material is in the range of about 750–900° C.

54. An abradable seal assembly comprising:
a substrate, and
an abradable seal coating deposited on the substrate by thermal spraying, the abradable seal coating comprising:
(A) an alloyed metal phase material having a melting point in the range of about 750–1000° C., the alloyed metal phase material including at least one of the metals from each of the following groups:
(i) a major amount of a matrix metal selected from the group consisting of Ag and Cu;
(ii) a melting point-depressing metal selected from the group consisting of Si, B, Mn and Al;
(iii) an oxidation-resistant metal selected from the group consisting of Al, Cr and Si; and
(B) a solid lubricant ceramic phase material comprising hexagonal boron nitride.

55. An abradable seal assembly comprising:
a substrate, and
an abradable seal coating deposited on the substrate by thermal spraying, the abradable seal coating consisting essentially of:
(A) at least 75 weight percent, based on the total weight of the seal coating, of an alloyed metal phase material having a melting point in the range of about 750–1000° C., the alloyed metal phase material including at least one of the metals from each of the following groups:
(i) a major amount of a matrix metal selected from the group consisting of Ag and Cu;
(ii) a melting point-depressing metal selected from the group consisting of Si, B, Mn and Al;
(iii) an oxidation-resistant metal selected from the group consisting of Al, Cr and Si;
wherein, if the matrix metal is Ag, the melting point-depressing metal is not solely Mn;
(B) at least 10 weight percent, based on the total weight of the seal coating, of a solid lubricant ceramic phase material comprising hexagonal boron nitride; and, optionally,
(C) as much as a total of 4 weight percent, based on the alloyed metal phase material, of one or more of Y, Ce, La, or rare earth metals, wherein the abradable seal coating has a theoretical density greater than about 50%.

56. The seal assembly as set forth in claim 55, wherein the abradable seal coating erodes at a rate no greater than 1.5 g/min when tested in accordance with an erosion resistance test comprising projecting a grade SIL-3 (Bruderheim, Alberta, Canada) silica sand at the seal coating from an air nozzle having an internal diameter of 0.476 cm, the distance from the nozzle to the seal coating being 10 cm, at a sand feed rate of 32 g/min, an air flow rate of 151 l/min, a temperature of 24° C., for a duration of 1 minute, the seal coating being positioned perpendicular to the direction of the flow of sand particles, and which causes no more than 0.0127 mm of wear to a titanium alloy blade when tested in accordance with an abradability test comprising contacting the seal coating with a blade comprising 6% Al, 2% Sn, 4% Zr, 2% Mo, the balance Ti, the blade having a width of 3.114 cm, a thickness of 0.091 cm, and normalized to obtain a 0.508 mm deep groove in the seal coating, at a blade tip speed of 351 m/s, an incursion rate of 0.25 cm/s, the blade and the seal coating interacting over a distance of 1.02 mm.

57. The seal assembly as set forth in claim 56, wherein the alloyed metal phase material of the seal coating has a melting point in the range of about 750–900° C.

58. The seal assembly as set forth in claim 56, wherein the alloyed metal phase material includes:
(A) at least one of said melting point-depressing metals, included in the following percent weight range amounts, based on the alloyed metal phase material; Si (1–30%), B (1–20%), Mn (20–50%), and Al (30–50%); and,
(B) at least one of said oxidation-resistant metals, included in the following percent weight range amounts, based on the alloyed metal phase material; Al (1–30%), Cr (1–30%), and Si (1–20%).

59. The seal assembly as set forth in claim 58, wherein the matrix metal is Ag and the melting point-depressing metal and the oxidation-resistant metal is Si.

60. The seal assembly as set forth in claim 59, wherein the amount of hexagonal boron nitride is in the range of about 10–20 weight percent, based on the total weight of the abradable seal coating, the amount of Si is in the range of about 2.0–2.8 weight percent, based on the total weight of the abradable seal coating, and the balance of the abradable seal coating is Ag.

61. The seal assembly as set forth in claim 58, wherein the matrix metal is Cu, the melting point-depressing metal is Mn, and the oxidation-resistant metal is Al.

62. The seal assembly as set forth in claim 61, wherein the amount of hexagonal boron nitride is in the range of about 10–20 weight percent, based on total weight of the abradable seal coating, the amount of Mn is about 20–30 weight percent, based on the total weight of the abradable seal coating, the amount of Al is about 1–5 weight percent, based on the total weight of the abradable seal coating, and the balance of the abradable seal coating is Cu.

63. The seal assembly as set forth in claim 56, wherein the substrate is a shroud of a gas turbine engine.

* * * * *

UNITED STATES PATENT AND TRADEMARK OFFICE
CERTIFICATE OF CORRECTION

PATENT NO. : 5,976,695
DATED : November 2, 1999
INVENTOR(S) : Hajmrle et al.

It is certified that error appears in the above-identified patent and that said Letters Patent is hereby corrected as shown below:

```
In the Specification
  Col. 9, line 5, insert after "Ag" --In a particularly
                  preferred embodiment, the AgSi-BN powder
                  is thermally sprayed onto a substrate to form a
                  final coating having an amount of hexagonal boron
                  nitride in the range of about 10-20 weight
                  percent, based on the total weight of the
                  abradable seal coating, an amount of Si in the
                  range of about 2.0-2.8 weight percent, based on
                  the total weight of the abradable seal coating,
                  and the balance being Ag.--

In the Claims
  Col. 10, line 46, "AI" should be --Al--
  Col. 13, line 6,  "151 I/min" should be --151 l/min--
  Col. 15, line 2,  "151 I/min" should be --151 l/min--
  Col. 16, line 46, "151 I/min" should be --151 l/min--
  Col. 18, line 42, "151 I/min" should be --151 l/min--
```

Signed and Sealed this

Seventeenth Day of April, 2001

*Attest:*

NICHOLAS P. GODICI

*Attesting Officer*    *Acting Director of the United States Patent and Trademark Office*